United States Patent [19]

Donofrio et al.

[11] 4,330,836

[45] May 18, 1982

[54] ELEVATOR CAB LOAD MEASURING SYSTEM

[75] Inventors: Andrew J. Donofrio, Newington; John E. Gaines, Granby, both of Conn.

[73] Assignee: Otis Elevator Company, Hartford, Conn.

[21] Appl. No.: 98,004

[22] Filed: Nov. 28, 1979

[51] Int. Cl.³ .................. B66B 1/44; G01G 19/413
[52] U.S. Cl. ................................. 364/567; 187/29 R
[58] Field of Search ...................... 187/29 R; 364/567

[56] References Cited

U.S. PATENT DOCUMENTS

| | | | |
|---|---|---|---|
| 2,713,645 | 7/1955 | Lerch | 187/29 R |
| 3,536,163 | 10/1970 | Jordanidis | 187/29 R |
| 3,543,883 | 12/1970 | Kuzara | 187/29 R |
| 3,916,173 | 10/1975 | Williams, Jr. et al. | 364/567 |

*Primary Examiner*—Felix D. Gruber
*Attorney, Agent, or Firm*—Robert E. Greenstien

[57] ABSTRACT

Transducers are located between the elevator cab and the supporting frame at points which lie along a line that passes through the cab center of deflection. These transducers produce an analog output whose magnitude varies proportionally with the force applied through the transducer to the cab. The outputs of the transducers are summed together and their actual sum corresponding to the empty car condition is subtracted from the sum of the outputs and the remainder is multiplied by the actual ratio between car weight and the sum of the transducer outputs. This yields the cab load.

22 Claims, 5 Drawing Figures

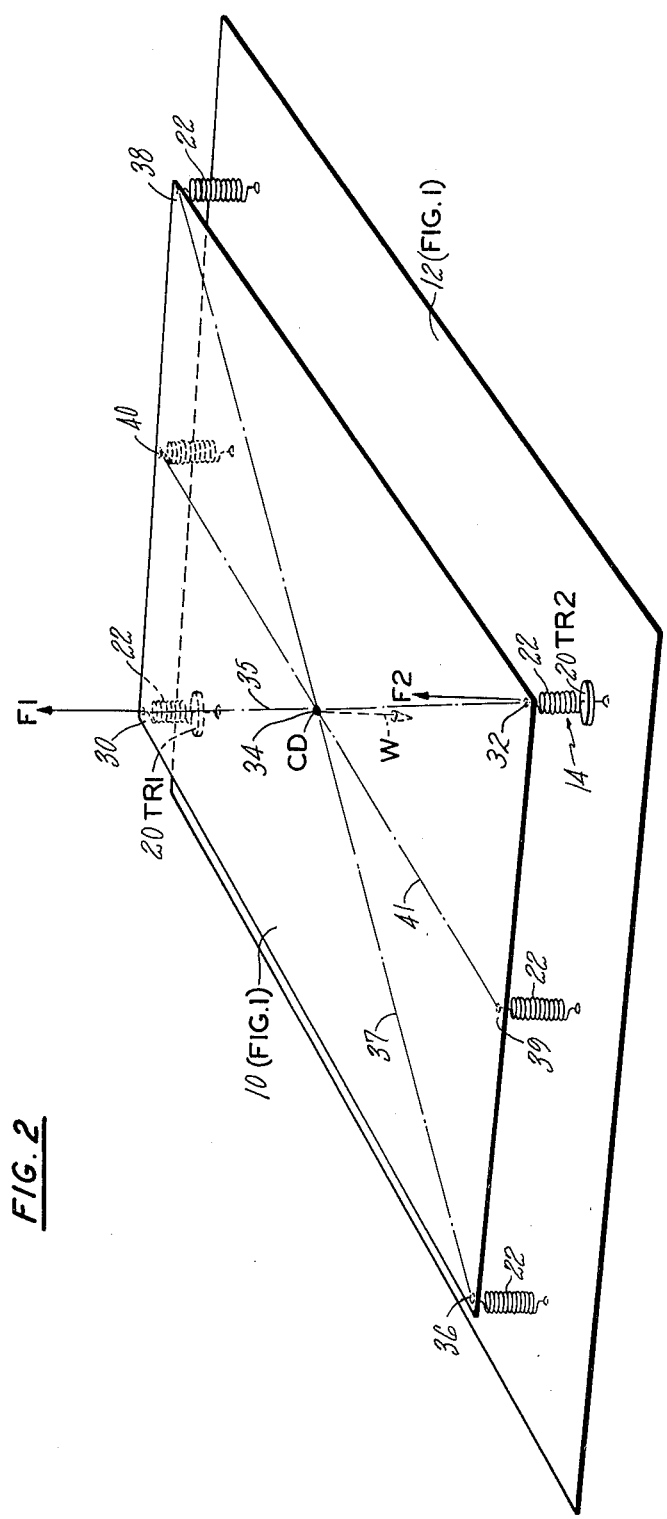

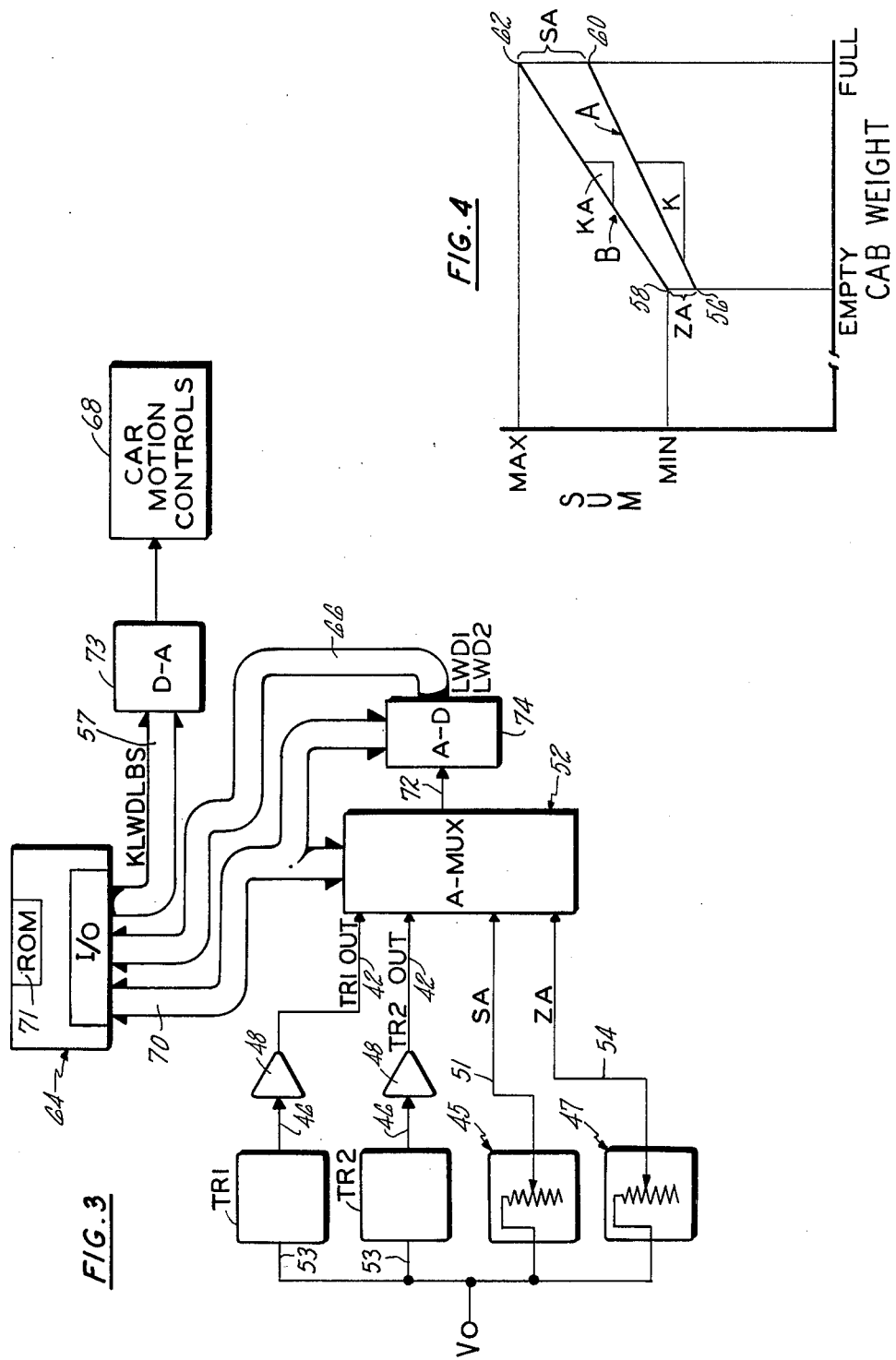

ELEVATOR CAB LOAD MEASURING SYSTEM

DESCRIPTION

1. Technical Field

This invention relates to equipment for measuring elevator cab loads.

2. Background Art

Superior elevator performance is possible by controlling elevator cab movement in relation to actual cab loads. The ride, for instance, can be smoother because unacceptable acceleration and deceleration rates can be avoided by controlling motor torque as a function of actual weight; uneven or jerky car movement is thus prevented. Changes in cab weight at the floors can also provide an indication of car usage and from that cab allocation can be made in a way that provides minimum service request response time. The capability to know the cab weight at any instant in time consequently can be very useful in providing efficient, comfortable elevator service, mainly because operation can be tailored, in a dynamic way, to actual cab conditions. This capability also provides the possibility to conserve energy by tailoring power usage to actual requirements.

Systems that determine elevator cab weight have been in use for some time, and all of them operate on basically the same principle: they measure a displacement resulting from the change in cab weight. The majority of these systems measure the change in the size of shock absorbing springs or pads that support the elevator cab within a surrounding car support structure to which the hoist ropes are connected. As the cab weight within that support structure increases, these support devices are compressed and the extent to which that compression changes with loads manifests the reactive force they exert on the cab to support the load; thus it also indicates the load changes. By correlating the changes that occur when the cab is loaded and empty, the load can be determined—but not with very great precision or repeatability. Other related systems measure the entire displacement, relative to the shaftway, from the stretching that takes place in the hoist ropes as the loads change.

Displacement measuring systems do not necessarily provide accurate, repeatable results and thus precise car motion control is not possible. One factor contributing to those inaccuracies is the inherent hysteresis in the elastomeric material used in the pad that are found in most systems for providing ride cushioning. This hysteresis often is significant and unpredictable and is particularly susceptible to changes in relation to temperature. Because of this, a system which is premised upon measuring the displacement of all the supporting buffers in order to determine the aggregate reactive force cannot be exceedingly precise. The inaccuracies are even worse in systems premised on sensing the change in cable length. One reason is that the length of the cable supporting the cab is not the same at the top and bottom of the shaftway, and as a result, the amount of cable stretch that occurs for a given weight is different at different points in the shaft. Another reason is that the stretch is determined by the entire weight of the car structure, but that weight is significantly greater than the changes in sensed cab loads. Consequently, most of the cable stretch occurs from the entire car weight (frame and cab). These systems therefore have poor resolution as well.

Thus the state of the art manifests a pronounced need for far more precise load sensing-weighing systems.

DISCLOSURE OF INVENTION

Rather than measuring cab weight indirectly, by first measuring displacement and from that determining the reactive force applied to the cab from an ideal elastomeric pad or spring, a system of the present invention employs a dramatically different approach: the reactive force applied through the pad to the car is directly sensed by means of a force transducer which is located between the buffer and the cab support structure. Consequently, owing to the fact that the invention provides for direct weight measurement transducers do not have to be fixed at each support point, because, at opposite points on a line that passes through the center of deflection, an aggregate force is provided which reflects the total force and the weight. Thus a single transducer may be used at the center of deflection of the cab, or pairs of transducers, located diametrically opposite to each other along a line passing through the center of deflection, may be used. The actual load is determined by referencing the reactive force sensed by these transducers to the total number of support points.

Since the sum of the reactive force is transmitted through the transducers and is proportional to the actual weight, that weight can be computed by summing the outputs of the transducers and scaling them to the maximum and minimum cab weight to compute the load.

A feature of the present invention therefore is that it provides a system whose accuracy and repeatability is unaffected by the characteristics of the elastomeric buffers or springs that are used to support the cab.

Another feature is that a system which uses only two transducers or even one, is considerably less expensive than prior art systems utilizing displacement detection devices at each of the support points.

BRIEF DESCRIPTION OF DRAWINGS

FIG. 2 is a diagram of a simplified equivalent model of an elevator car structure; the cab is resiliently mounted at six points; at two of those points force sensing transducers are disposed between cab and the structure and a pad is disposed between the transducer and the cab.

FIG. 3 is a block diagram of a system embodying the present invention; this system uses two force transducers which are located as shown by the transducers in FIG. 2.

FIG. 4 is a graph which shows the relationship between reactive force and the combined output voltage for the two transducers that are shown in the exemplary system in FIG. 3.

BEST MODE FOR CARRYING OUT THE INVENTION

Figure 1:
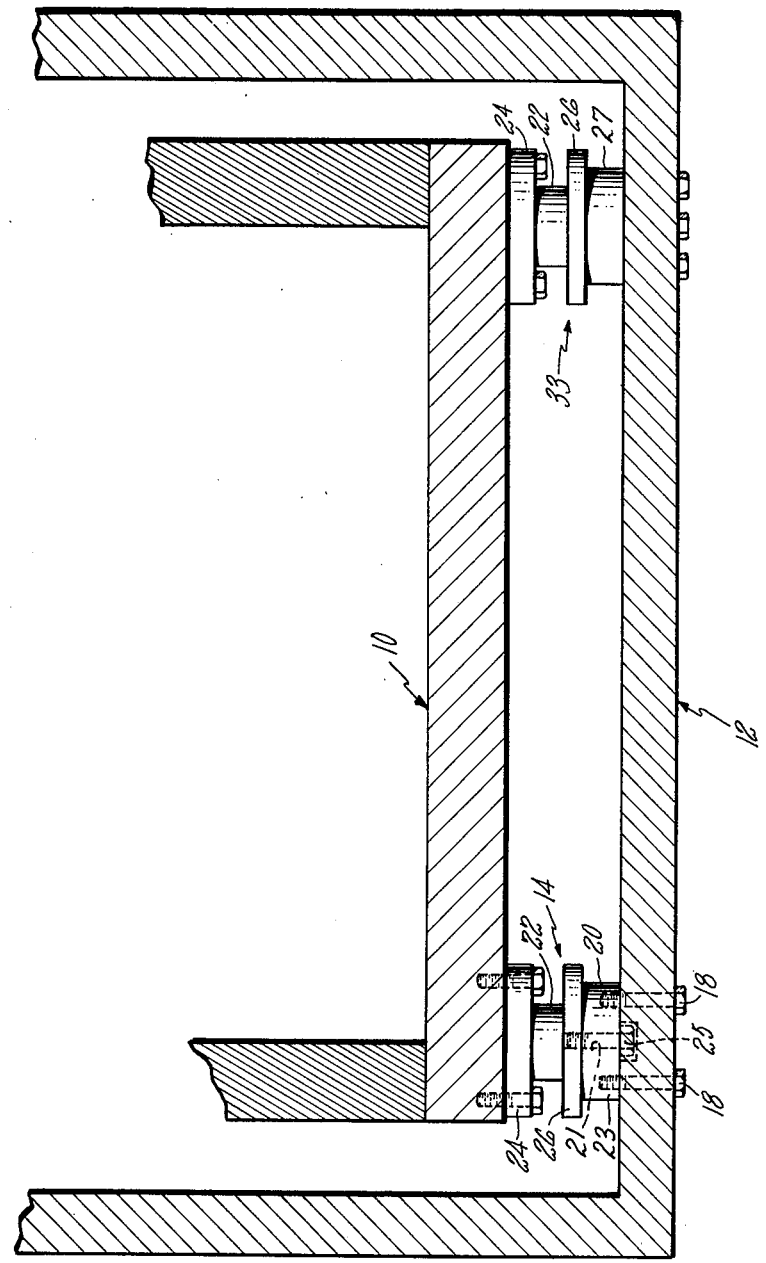
FIG. 1 is an elevational view of a portion of a simplified elevator car structure; in this structure one end of the cab is supported on a frame by a transducer and pad arrangement according to the present invention and the other end is supported by an elastomeric pad and a spacer.

In FIG. 1 the floor 10 of an elevator cab is attached to a frame 12 by means of a support assembly 14. This assembly includes a reactive force transducer 20, which is bolted by means of bolts 18 to the frame 12, and a resilient pad 22. A metal plate 24 is bolted to the cab floor 10, and a bolt 25 passes through the center of the transducer 20 and attaches to the plate 26. The cab is mechanically connected to the frame through the transducer by means of the bolt 25 and to the bolt through the pad. The transducer is of the beam type. These have a beam structure (not shown) extending from the fastening bolts 18 to the transducer center 30, which is essentially movable vertically with the car, whereas the outer portion 32 is fixed to the frame by the bolts 18 and, hence, is not likewise movable. Vertical reactive forces (weight) are applied through the bolt 25 and produce strains on these beams. The beams contain strain elements and a constant voltage applied to these elements, and they produce a single transducer output voltage that changes proportionally with the strain—the vertical force on the transducer. An example of a suitable transducer of this type is model B-600-018 made by Genesco Corporation. It has a gain of 0.2 mv/volts/1000 lbs. for a range from zero to one thousand pounds. Thus if 10 V.D.C. is applied, the output increases linearly from 0 to 2 mv for a 1000 lbs. load.

FIG. 2 is a diagram of a simplified mechanical model of an elevator car; the pads 22, for instance, are depicted by their function equivalents—springs. The cab 10 is supported at six points on the frame 12. At two of these points 30, 32 support is provided by the assembly 14. At the other support points 36, 38 an assembly 33 is used, and as shown in FIG. 1, it consists of the elastomer 22 and a shim 34 which takes up the space of the transducer 20 that it replaces. The points 30, 32 are on a line 35 which passes through the center of deflection 34 of the floor 10. The points 36, 38 are on a line 37 which also passes through the center of deflection 34, and the points 39, 40 are on a line 41 which also passes through the center of deflection. The center of deflection (C.D.) is simply the point which moves only in the vertical direction, depending upon changes in weight W (empty cab+passengers) applied to the floor, regardless of how the weight is distributed. If the weight is located on the line 27 but not precisely at the center of the cab, i.e. at 35, it can be reflected back to the line 37. From that it creates a moment around each point 36, 38 and reactive force at each point similarly creates a moment around its opposite point. But when the floor is in equilibrium, the total reactive force at the points 36, 38 must equal a portion of the weight reflected on the line, but the magnitude of that portion does not change with the location of the weight, although that changes the tilt around the center of deflection. The sum of the moments around the points also equals zero in the equilibrium condition. Thus the location of the weight on the floor simply determines the ratio between the forces at the two points 36, 38; yet the sum remains the same—for a given weight. This analysis assumes a simple beam extending between the points 36, 38 but it is equally applicable to a multi-supported system, i.e. the model in FIG. 2. There by using the same procedure, reflecting the weight to the line of action between the support points, the force at any two points on opposite sides of the center of deflection on the same line passing therethrough is a portion of the overall weight of the car and does not vary with the location of the weight. The effect of this is simply that if the pads all have substantially the same force coefficient, even though the floor tilts as the weight is moved around, the sum of the reactive forces at points 30, 32, for example, always provides the same portion of the overall weight. The center of deflection therefore is simply the point at which there is no floor rotation from the moments and only resultant vertical displacement from the weight that effectively appears there. For another, simpler way, as weight is added to the floor, the sum of the reactive forces (i.e. F1, F2) at any two points substantially on a line passing through the center of deflection increases—and no matter where the weight is applied, that sum is the same, even though the change it (weight location) causes in F1 and F2 may be different, depending upon the weight distribution. Thus $F1+F2=M \cdot weight/N$ (M=number of transducers and N=number of support points), assuming that the spring rates for the pads are the same. Thus, by summing the outputs from the transducers TR1 and TR2 the force can be determined simply by multiplying the force, which that sum represents, by three. Similarly, if four transducers (one at each corner) are used and their outputs summed together, that sum represents an aggregate force which is two-thirds of the total reactive force.

Obviously, if a transducer and pad were to be located at the center of deflection, the reactive force at that point would be one-seventh of the total weight; again because there is no torque at the center of deflection. Therefore, by using force transducers to detect actual reactive forces it is possible to use one transducer at the center of deflection (seven support points) or two transducers TR1, TR2, i.e. at points 30, 32 on a line through the center of deflection, or more, according to the same principles.

FIG. 3 is a block diagram of a system for determining load or passenger weight through the use of the two transducers TR1 and TR2 in the model shown in FIG. 2. Each of these transducers has an associated output line 40 which is connected to a buffer amplifier 42 having an output line 44 which connects to an analog multiplexer (A-MUX) 45. Each transducer is powered from a constant DC voltage V which is supplied to an input 46 on each transducer. From this voltage each transducer produces an output voltage on its output line 42 and this output voltage is proportional to the reactive force which is applied through the transducer.

FIG. 4 is a graph which shows the relationship between the combined outputs (sum) from the two transducers TR1 and TR2 with respect to the total reactive force they supply to the car at their associated support points. Line A is based on the estimated outputs from these transducers when the car is empty and fully loaded. Line B, however, represents the actual relationship and is derived from a computation using the equation defining the line A and modifying the slope and the minimum weight point based upon the difference between the estimated and actual car loads when the car is empty and full. This computational process is developed in greater detail later in this description.

From the DC voltage V a circuit 50 provides a preadjustable DC reference voltage (span adjust) on its output line 51 to the multiplexer 52. A circuit 53 similarly provides a preadjustable reference voltage (zero adjust) on an output line 54 which goes to the multiplexer. Each of these circuits may be simply a potentiometer. The zero adjust (ZA) is the difference between an estimated minimum sum (min sum) 56 (in FIG. 4) and the actual minimum sum 58 for the empty car; likewise the span adjust (SA) is the difference between an estimated maximum sum (max sum) 60 and the actual maximum sum 62 when the car is fully loaded. The estimated minimum sum 56 is stored in a ROM 62 which is part of a microcomputer 64 that is employed to carry out certain computational routines to determine load weight from the transducers TR1 and TR2 based upon the straight line equation defining the relationship between load weight and the transducer outputs. Also stored in the ROM is the slope (K) of the line A between the estimated points.

In the system in FIG. 3 once the passenger load is determined it is supplied to a D-A converter 56 over a line 57 from the computer. The D-A converter produces an analog signal which may be supplied to a variety of possible car motion controls 68; these are generically depicted because they form no part of the invention. Nevertheless, these controls may control elevator car motion, provide utilization monitoring or both.

Figure 5:
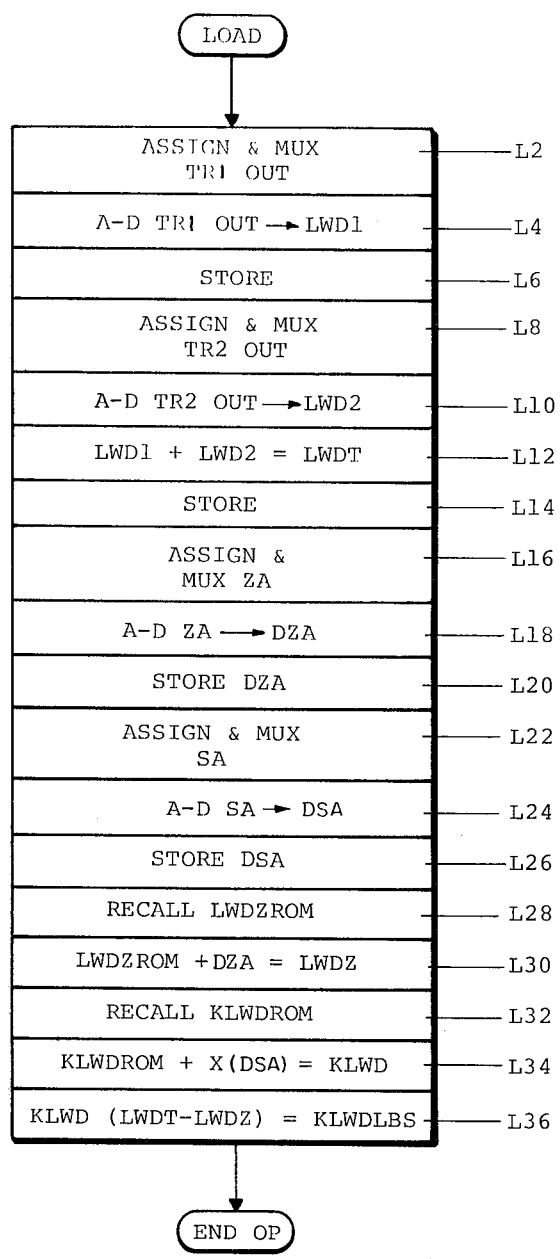
FIG. 5 is a flow chart that sets forth the routine for deriving load weight from two transducers in FIG. 4 by means of a computer.

The flow chart which comprises FIG. 5 depicts a routine for selecting the analog transducer outputs, the analog span adjust (SA) and the zero adjust (ZA) and converting these analog signals into digital and from that computing the load from a line equation defining the line B. This equation is:

$$(3)(K+X(SA)(sum-min\ sum+ZA)$$

where X scales the span adjust (SA) to the slope. Alternatively, the span adjust and zero adjust can be used to define the beginning and end points of the line B and from that the slope, but there is an advantage in the former approach in that better resolution is provided because the change in the transducer outputs caused by passenger loads is much smaller than the actual empty weight of the cab.

The computer retrieves the analog information (TR1 OUT, TR2 OUT, SA, ZA) from the transducers and the span adjust and zero adjust circuits by the transmission of command signals to the A-MUX unit 52 over a line 70 from the computer in order to select a particular multiplexer input which is then supplied over a line 72 to the input of an A-D converter 74. This converter, on a command over the line 60 from the computer, converts the analog information into digital and supplies this digital information over a line 73 to the computer 64. This A-D converter simply may be a counter whose output count is proportional to the analog signal that is supplied to its input from the multiplexer.

The flow chart in FIG. 5 illustrates the sequential steps which are performed in a load computation routine LOAD by the computer, using the analog information from the transducers and the span and zero adjust circuits together with the stored slope (KLWDROM) and the stored minimum car weight (LWDZROM). In this routine the multiplexer input containing TR1 OUT is selected L2 which causes TR1 OUT to appear on the multiplexer output line that goes to the A-D converter. TR1 OUT is then converted L4 into a digital equivalent (LWD1) reflecting the transducer reactive force. LWD1 is then stored L6 in the computer memory. TR1 OUT is then selected L8 and converted L10 into its digital equivalent (LWD2). LWD1 and LWD2 are summed L12 and the sum (LWDT) is stored L14 in the computer memory. The zero adjust (ZA) is selected L16 and converted L18 to its digital force equivalent (DZA) which is then stored L20 in the computer memory. Similarly, the span adjust (SA) is selected L22 and then converted L24 to its digital equivalent (DSA) which is then stored L26 in the computer memory. The stored estimated minimum empty car weight (LWDZROM) is recalled L28 and summed L30 with DZA to yield the corrected minimum load weight (LWDZ). The stored estimated slope (KLWDROM) is recalled L32 and summed L34 with a correction (X) (DSA) to yield the corrected slope KLWD. (As previously stated, X is a stored coefficient for properly scaling DSA to the slope.) The corrected minimum load weight (LWDZ) is subtracted from the actual load weight (LWDT) and the remainder is multiplied by the corrected slope KLWDT to yield the load (KLWLBS).

A similar procedure obviously may be utilized with more than two transducers, for instance four, and in that case the difference in the routine would principally be the inclusion of additional steps for retrieving the outputs from the transducers and providing for their conversion into a digital format and then summing them with the outputs from the transducers TR1 and TR2. Obviously, the span adjust and zero adjust would have to be different because the overall sum of these transducers would be greater reflecting the greater aggregate reactive force that is being sensed. The previously described routine provides the most accurate way to compute the load from the analog outputs provided by the transducers because the ratio between the passenger loads and total car load are actually small in most applications; this particular routine avoids resolution problems. Further, while the computer has been shown and discussed for performing these computations, they no doubt can also be done in a totally analog circuit or one consisting of discrete logic circuits. Still a computer based approach is preferred because it can be done as a routine in a computer that is used to control many other elevator motion functions.

The foregoing is a description of the best mode for carrying out the invention; yet it may suggest to one skilled in the art, numerous modifications, variations and alterations in and to the embodiment shown and described without departing from the true scope and spirit of the invention embodied therein and described in the following claims.

We claim:

1. An elevator system wherein the cab is supported on a frame and passenger/duty load is determined by means of a system comprising:

apparatus which is located between the cab and the frame and through which a portion of the overall cab supporting force is transmitted to at least one selected point on the cab, said apparatus generating a signal associated with each selected point, the magnitude of said signal manifesting the force transmitted therethrough to the cab, the location of the selected point or points being such that the total supporting force transmitted through the selected point or points is the same for a given weight regardless of the distribution of the weight in the cab, said apparatus including a force transducer at each selected point for generating said signal, and means responsive to the transducer signals and a signal reflecting the empty cab weight for providing a cab load signal reflecting the sum of all the signals from the transducers and for providing a passenger/duty load signal reflecting the difference between that cab load signal and the signal reflecting the empty cab weight.

2. An elevator system according to claim 1, wherein said apparatus includes a force transducer which is located substantially at the cab center of deflection.

3. An elevator system according to claim 1 wherein said apparatus includes two force transducers which are located on a straight line that passes substantially through the center of deflection at opposite points thereon with respect to the center of deflection.

4. An elevator system according to claims 1 or 2 wherein the cab is resiliently supported at a plurality of support points including those points to which force is transmitted through said apparatus to the cab.

5. An elevator system according to claim 3 wherein the cab is resiliently supported at a plurality of support points including those points to which force is transmitted through said apparatus to the cab.

6. An elevator system according to claim 1, characterized in that said means for summing comprises:
processing means for summing said signals, and assigning a cab weight parameter to said sum, for subtracting a first cab weight parameter reflecting the actual empty cab weight from said assigned parameter to produce a weight change parameter, for multiplying said weight change parameter by a second weight related parameter reflecting the relationship between the change in said sum and actual cab weight to produce a second parameter reflecting the passenger/duty load.

7. An elevator system according to claim 6, characterized in that:
said processing means comprising means for storing a third predetermined parameter reflecting estimated empty cab weight and a fourth parameter reflecting an estimated relationship between said sum and actual cab weight, and for adding corrections to said stored estimated parameters to generate said first and second cab weight parameters.

8. An elevator system according to claim 7, characterized in that it further comprises:
means for adjustably setting and generating said corrections, and
processing means for selecting said corrections each time the passenger/duty load is determined.

9. An elevator system according to claim 8, characterized in that it further comprises:
a multiplexer for sequentially selecting each of said signals and said corrections, and
said processing means comprising means for controlling said multiplexer to sequentially select each of said signals and corrections prior to the determination of passenger load.

10. An elevator system according to claim 9, characterized in that:
said signals and said corrections are analog signals, and further comprising:
an A-D converter,
said processing means comprising means for controlling said A-D converter to convert each said signal and correction to a digital format, for use by said processor, following the selection of each said signal and correction.

11. An elevator system according to claim 7, characterized in that the correction for said first parameter reflects the difference between actual and estimated empty cab weight and said correction to said second parameter reflects the difference estimated and actual full, maximum cab weight.

12. An elevator system according to claim 8, characterized in that the correction for said first parameter reflects the difference between actual and estimated empty cab weight and said correction to said second parameter reflects the difference estimated and actual full, maximum cab weight.

13. An elevator system according to claim 12, characterized in that said corrections are obtained by adjusting said correction setting means when the cab is empty and fully loaded.

14. An elevator system wherein a cab is supported resiliently on a frame at selected support points and car weight is determined by means of a load weighing system comprising:
a transducer which is located between the cab and the frame and through which a cab supporting force is transmitted to a point on the cab, said transducer generating a signal having a magnitude that manifests the magnitude of the force transmitted therethrough to the cab, said point being located substantially at the cab center of deflection, and
means responsive to the transducer signals and a signal reflecting the empty cab weight for providing a cab load signal reflecting the sum of all the signals from the transducers and for providing a passenger/duty load signal reflecting the difference between that cab load signal and the signal reflecting the empty cab weight.

15. An elevator system wherein a cab is supported resiliently on a frame at selected support points and cab weight is determined through the use of a load weighing system comprising:
two transducers which are located between the cab and the frame and through which a cab supporting force is transmitted to two corresponding points on the cab, each transducer generating a signal having a magnitude reflecting the force transmitted through the transducer to its corresponding point on the cab, said transducers being located at opposite sides of the cab center of deflection and on a line that passes substantially through the center of deflection, and
means responsive to the transducer signals and a signal reflecting the empty cab weight for providing a cab load signal reflecting the sum of all the signals from the transducers and for providing a passenger/duty load signal reflecting the difference between that cab load signal and the signal reflecting the empty cab weight.

16. An elevator system wherein the cab is supported on a frame and cab weight is determined through the use of a load weighing system which operates by:
sensing a supporting force between the frame and the cab at selected points which are related in that the aggregate force supporting the cab at those points is the same regardless of the weight distribution in the cab, generating a signal which is proportional to the sensed force at each point, and
summing said signals to provide cab load, then subtracting the empty cab load from the determined cab load to determine passenger/duty load.

17. An elevator system according to claim 16 wherein said force is sensed at two points which are on opposite sides of the center of deflection and on a straight line substantially passing therethrough.

18. A load weighing system for use in an elevator system wherein the cab is supported on a frame, said system comprising:

apparatus which is located between the cab and the frame, said apparatus transmitting supporting force to the cab through at least one selected point on the cab and generating a signal associated with each selected point, the magnitude of the signal reflecting the force transmitted to its corresponding point, each point or points being selected so that the sum of the forces at the selected point or points is substantially the same for a given weight regardless of the distribution of the weight in the car, and means responsive to the transducer signals and a signal reflecting the empty cab weight for providing a cab load signal reflecting the sum of all the signals from the transducers and for providing a passenger/duty load signal reflecting the difference between that cab load signal and the signal reflecting the empty cab weight.

19. A system according to claim 18 wherein said apparatus comprises a force transducer located substantially at the cab center of deflection.

20. A system according to claim 18 wherein said apparatus comprises two force transducers located at opposite sides of the cab center of deflection and on a straight line which passes substantially therethrough.

21. A system according to claims 19 or 20 wherein the cab is resiliently supported at a plurality of support points including the points to which force is transmitted through the transducers.

22. An elevator passenger load detecting system for use with a cab structure wherein the cab is supported in a frame to which the cab hoisting apparatus connects, said system comprising:

two force responsive transducers which provide an output signal whose magnitude changes in proportion to the force applied by said transducers, said transducers being located between the frame and the cab along a line substantially through the cab's center of deflection, said transducers being oppositely located with respect to the center of deflection, and processing means for storing an estimated empty cab weight and estimated change in the sum of said signals between said estimated empty weight and an estimated full cab weight; for adding externally applied corrections to said store parameters every time passenger load is computed to generate an actual empty cab weight which equals the weight reflected by the sum of said signals for an empty cab, and a full cab weight which equals the weight reflected by said sum when the cab is actually full; for subtracting said actual empty weight from the weight reflected by said sum; for multiplying the remainder by a coefficient reflecting the ratio between the sum and the difference between said actual empty weight and said actual full cab weight, and adjustable means for generating said corrections.

* * * * *

UNITED STATES PATENT AND TRADEMARK OFFICE
CERTIFICATE OF CORRECTION

PATENT NO. : 4,330,836
DATED : May 18, 1982
INVENTOR(S) : Andrew J. Donofrio; John E. Games It is certified that error appears in the above-identified patent and that said Letters Patent are hereby corrected as shown below:

Cover Page, after "Inventors:", change "John E. Gaines" to

--John E. Games--

Column 5, line 25, change "(3)(K+X(SA)(sum-min sum+ZA)" to (3) (K + X(SA)) (sum - min sum + ZA)--

Signed and Sealed this

*Twenty-fourth* Day of *August 1982*

[SEAL]

*Attest:*

GERALD J. MOSSINGHOFF

*Attesting Officer*      *Commissioner of Patents and Trademarks*